US012062873B2

(12) United States Patent
Mozdzer et al.

(10) Patent No.: US 12,062,873 B2
(45) **Date of Patent: *Aug. 13, 2024**

(54) RECEPTACLE HAVING MOTION ACTIVATED GUIDE LIGHT

(71) Applicant: Hubbell Incorporated, Shelton, CT (US)

(72) Inventors: Mark Anthony Mozdzer, Derby, CT (US); Felix Omar Perez, Shelton, CT (US); John Edward Brower, Fairfield, CT (US)

(73) Assignee: Hubbell Incorporated, Shelton, CT (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/902,530

(22) Filed: Sep. 2, 2022

(65) Prior Publication Data

US 2022/0416482 A1 Dec. 29, 2022

Related U.S. Application Data

(63) Continuation of application No. 16/195,017, filed on Nov. 19, 2018, now Pat. No. 11,437,764.

(Continued)

(51) Int. Cl.

*H01R 13/66* (2006.01)
*H01R 13/717* (2006.01)

(Continued)

(52) U.S. Cl.

CPC ..... *H01R 13/6683* (2013.01); *H01R 13/7175* (2013.01); *H05B 47/11* (2020.01); *H05B 47/115* (2020.01); *H01R 25/006* (2013.01)

(58) Field of Classification Search

CPC ............ H01R 13/6683; H01R 13/7175; H01R 25/006; H05B 47/11; H05B 47/115

See application file for complete search history.

(56) References Cited

U.S. PATENT DOCUMENTS 4,309,681 A 1/1982 Draper et al.
5,673,022 A 9/1997 Patel (Continued)

OTHER PUBLICATIONS

PCT/US2018/061791 International Search Report and Written Opinion dated Feb. 7, 2019 (16 pages).

(Continued)

*Primary Examiner* — Renan Luque

(74) *Attorney, Agent, or Firm* — Robinson & Cole LLP

(57) ABSTRACT

A receptacle including a housing having a front cover, an outlet located on the front cover, and a light configured to project light through the front cover. The receptacle further including a photo sensor, a motion detector, and a controller. The photosensor is configured to detect light and output a light signal corresponding to the detected light. The motion detector is configured to detect motion and output a motion signal corresponding to the detected motion. The controller includes a memory and an electronic processor. The controller is configured to receive the light signal, receive the motion signal, compare the light signal to a light signal threshold, compare the motion signal to a motion signal threshold, and activate at least one selected from a group consisting of the light and the outlet, when the light signal crosses the light signal threshold and the motion crosses the motion signal threshold.

20 Claims, 8 Drawing Sheets

Related U.S. Application Data

(60) Provisional application No. 62/589,765, filed on Nov. 22, 2017.

(51) Int. Cl.

| | |
|---|---|
| ***H01R 25/00*** | (2006.01) |
| ***H05B 47/11*** | (2020.01) |
| ***H05B 47/115*** | (2020.01) |

(56) References Cited

U.S. PATENT DOCUMENTS

| | | | | |
|---|---|---|---|---|
| 6,888,323 | B1 | 5/2005 | Null et al. | |
| 6,894,434 | B1 | 5/2005 | Kosoff | |
| 7,045,975 | B2 | 5/2006 | Evans | |
| 7,339,471 | B1 | 3/2008 | Chan et al. | |
| 9,892,630 | B1 * | 2/2018 | Strods | G08C 17/02 |
| 10,041,639 | B1 | 8/2018 | Thompson et al. | |
| 11,437,764 | B2 * | 9/2022 | Mozdzer | H05B 47/11 |
| 2002/0135476 | A1 | 9/2002 | McKinney et al. | |
| 2007/0040676 | A1 | 2/2007 | Bandringa | |
| 2008/0191630 | A1 | 8/2008 | Peng | |
| 2011/0301776 | A1 | 12/2011 | Goyal et al. | |
| 2011/0316355 | A1 | 12/2011 | Gruber | |
| 2012/0080944 | A1 | 4/2012 | Recker et al. | |
| 2014/0085922 | A1 | 3/2014 | Padro et al. | |
| 2014/0132084 | A1 * | 5/2014 | Pham | H01R 24/78 307/140 |
| 2014/0217898 | A1 | 8/2014 | Richards et al. | |
| 2014/0268881 | A1 | 9/2014 | Ku et al. | |
| 2015/0249337 | A1 | 9/2015 | Raneri et al. | |
| 2015/0255932 | A1 | 9/2015 | Dicks et al. | |
| 2015/0382436 | A1 | 12/2015 | Kelly | |
| 2016/0111837 | A1 | 4/2016 | Misener | |
| 2016/0153650 | A1 | 6/2016 | Chien | |
| 2016/0323489 | A1 | 11/2016 | Tang et al. | |
| 2016/0358719 | A1 | 12/2016 | Finnegan et al. | |
| 2016/0377276 | A1 * | 12/2016 | Furry | H05B 47/11 362/642 |
| 2017/0070090 | A1 | 3/2017 | Miller | |
| 2018/0308436 | A1 | 10/2018 | Krattiger | |
| 2018/0337495 | A1 | 11/2018 | Martinez | |

OTHER PUBLICATIONS

Chinese Patent Application No. 201890001408.2 First Office Action Issued by the China National Intellectual Property Administration dated Nov. 3, 2020, and translation.

* cited by examiner

RECEPTACLE HAVING MOTION ACTIVATED GUIDE LIGHT

RELATED APPLICATIONS

This application claims priority to U.S. patent application Ser. No. 16/195,017, filed Nov. 19, 2018, which claims priority to U.S. Provisional Patent Application No. 62/589,765, filed on Nov. 22, 2017, the entire contents of which are incorporated herein by reference.

FIELD

Embodiments relate to electrical receptacles.

SUMMARY

Nightlights or guide lights may be manually turned on and off, or controlled by a photocell, or photosensor. When controlled by a photosensor, the guide light may be on when light is below a threshold, regardless if a user is present, which may be an energy waste.

Thus, one embodiment provides a receptacle including a housing having a front cover, an outlet located on the front cover, and a light configured to project light through the front cover. The receptacle further including a photo sensor, a motion detector, and a controller. The photosensor is configured to detect light and output a light signal corresponding to the detected light. The motion detector is configured to detect motion and output a motion signal corresponding to the detected motion. The controller includes a memory and an electronic processor. The controller is configured to receive the light signal, receive the motion signal, compare the light signal to a light signal threshold, compare the motion signal to a motion signal threshold, and activate at least one selected from a group consisting of the light and the outlet, when the light signal crosses the light signal threshold and the motion crosses the motion signal threshold.

Another embodiment provides a method of controlling a receptacle. The method includes receiving, via a first sensor, a light signal, and receiving, via a second sensor, a motion signal. The method further includes comparing, via a controller, the light signal to a light signal threshold, and comparing, via the controller, the motion signal to a motion signal threshold. The method further includes activating at least one selected from a group consisting of a guide light of the receptacle and an outlet of the receptacle, when the light signal crosses the light signal threshold and the motion crosses the motion signal threshold.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
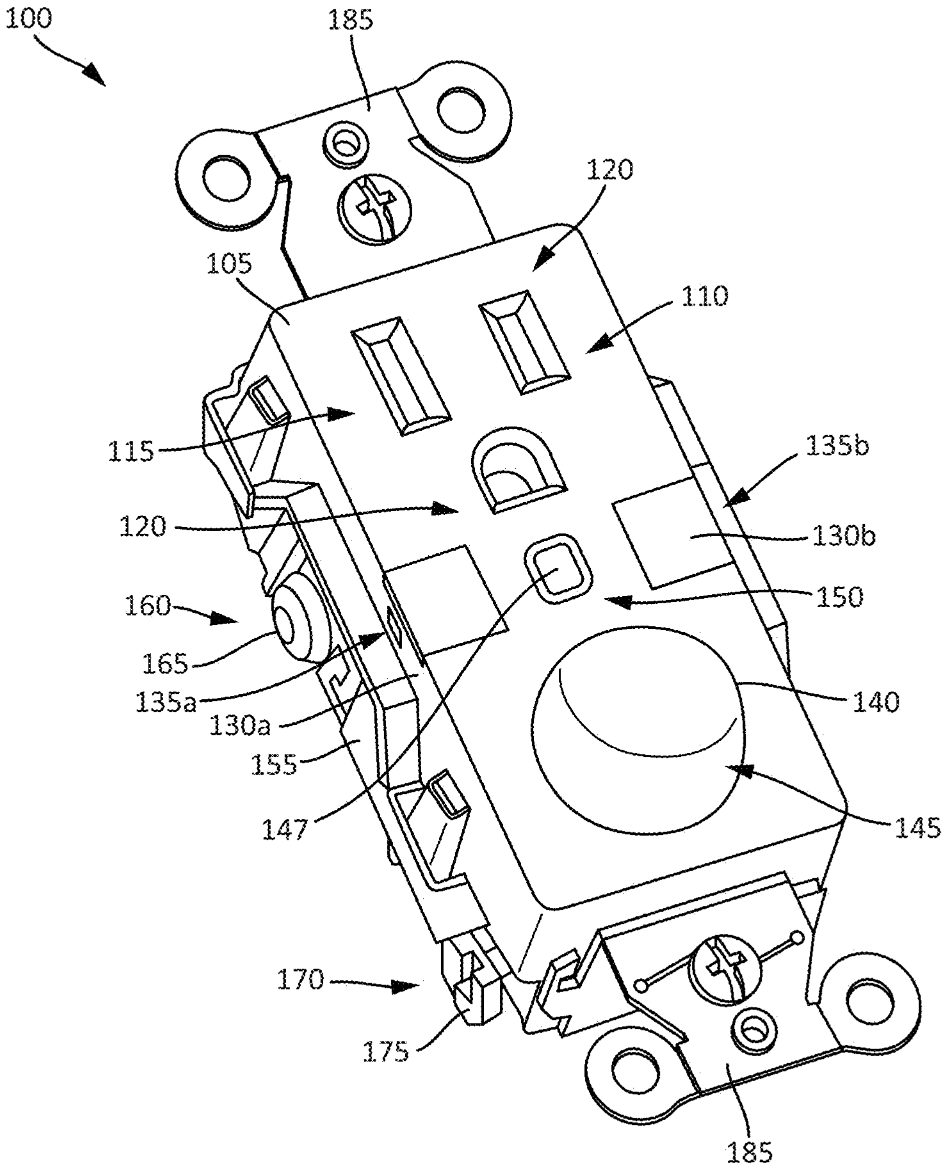
FIG. 1 is a perspective view of a receptacle according to some embodiments.

FIG. 1 illustrates a perspective view of a receptacle 100 according to some embodiments. In some embodiments, the receptacle 100 is a ground fault circuit interrupter (GFCI) device. In some embodiments, the receptacle 100 is configured to provide 120 VAC and/or 220 VAC. In some embodiments, the receptacle 100 may include a Universal Serial Bus (USB) outlet or other direct current (DC) outlet.

The receptacle 100 may include a front cover 105 having an outlet face 110. In the illustrated embodiments, the outlet face 110 is a duplex outlet face having a phase opening 115, a neutral opening 120, and a ground opening 125. In other embodiments, the outlet face 110 may be any NEMA standard outlet face, including but not limited to, a 5-15R outlet face, a 5-20R outlet face, 6-15R outlet face, and/or a 6-20R outlet face. In yet other embodiments, the outlet face 100 may be any non-NEMA standard outlet face. The front cover 105 may further include openings 130*a*, 130*b*, accommodating guide lights 135*a*, 135*b*, opening 140, accommodating a first lens 145, and opening 147, accommodating a second lens 150. In other embodiments, the front cover 105 may have more or less openings (for example, a single opening 130, accommodating a single guide light 135).

The receptacle 100 may further include a rear cover 155 secured to the front cover 105 by one or more fasteners. As illustrated, the rear cover 155 may include one or more terminals and terminal screws, such as but not limited to a line terminal 160 and line terminal screw 165, a neutral terminal and a neutral terminal screw, and a ground terminal 170 and a ground terminal screw 175. In the illustrated embodiment, the receptacle 100 further includes a ground yoke/bridge assembly including standard mounting ears 185 protruding from the end of the receptacle.

Figure 2:
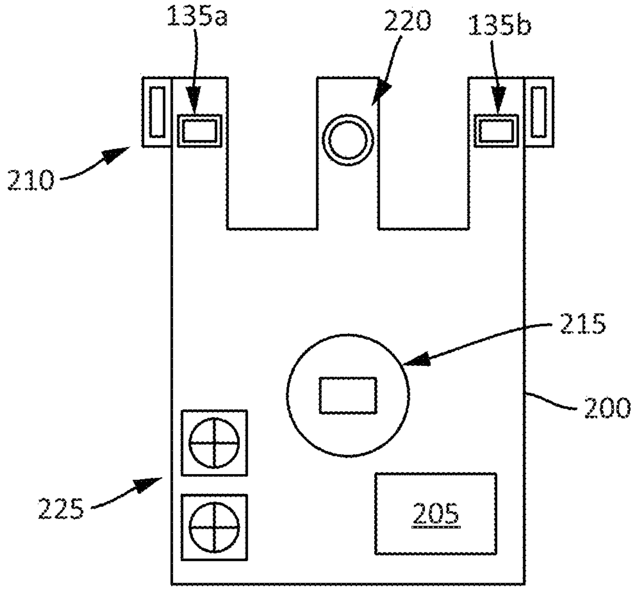
FIG. 2 is a circuit board diagram of a printed circuit board (PCB) of the receptacle of FIG. 1 according to some embodiments

FIG. 2 illustrates a circuit board diagram of a printed circuit board (PCB) 200 of the receptacle 100 according to some embodiments. In the illustrated embodiment, electrically and/or physically coupled to the PCB 200 are a controller 205, a power input 210, guide lights 135*a*, 135*b*, a motion sensor 215, a photosensor, or photoelectric sensor 220, and one or more user-inputs 225.

The controller 205 is electrically and/or communicatively connected to a variety of modules or components of the receptacle 100. For example, the controller 205 may be electrically and/or communicatively connected to the power input 210, guide lights 135, the motion sensor 215, the photosensor 220, and the one or more user-inputs 225.

In some embodiments, the controller 205 includes a plurality of electrical and electronic components that provide power, operational control, and protection to the components and modules within the controller 205 and/or the receptacle 100. For example, the controller 205 includes, among other things, an electronic processor (for example, a microprocessor or another suitable programmable device) and the memory. The memory includes, for example, a program storage area and a data storage area. The program storage area and the data storage area can include combinations of different types of memory, such as read-only memory (ROM), random access memory (RAM), (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor is communicatively coupled to the memory and executes software instructions that are stored in the memory, or stored on another non-transitory computer readable medium such as another memory or a disc. The software may include one or more applications, program data, filters, rules, one or more program modules, and other executable instructions.

The power input 210 is configured to receive power and provide a nominal power to the controller 205 and other components electrically connected to the PCB 200. In some embodiments, the power input 210 receives power via the line terminal 160. In such an embodiment, the power input 210 may include a power converter (for example, an AC-DC converter) configured to convert the alternating current (AC) power received from the line terminal 160 to a nominal direct current (DC) power. The nominal DC power may then be provided to the controller 205 and other components electrically connected to the PCB 200.

The guide lights 135*a*, 135*b* project light through openings 130*a*, 130*b* of the front cover 105. In some embodiments, the guide lights 135 are light-emitting diodes (LEDs). In some embodiments, the guide lights 135 may be adjusted directionally (for example, via a rotating lens). The motion sensor 215 is configured to detect motion. In some embodiments, the motion sensor 215 is an infrared (IR) motion sensor. In some embodiments, the motion sensor 215 has a 360° orientation having a 180° viewing angle. In the illustrated embodiment, the motion sensor 215 is located proximate the first lens 145 and is configured to detect motion through the first lens 145. The photosensor 220 is configured to detect light and/or other electromagnetic energy. In some embodiments, the photosensor 220 is a photodiode or a photo transistor. In the illustrated embodiment, the photosensor 220 is located proximate the second lens 150 and is configured to detect light and/or other electromagnetic energy through the second lens 150.

The one or more user-inputs 225 are configured to receive input from a user and output a signal to controller 205 based on the input. In some embodiments, the one or more user-inputs 225 may receive input corresponding to an on time of the guide lights 135, a brightness of the guide lights 135, a sensitivity of motion sensor 215, and/or a sensitivity of photosensor 220. Although illustrated as knobs, in other embodiments, the one or more user-inputs 225 may be one or more dials, switches, and/or buttons.

In some embodiments, the controller 205 may include, or be electrically coupled to, an input/output (I/O) module. In such an embodiment, the I/O module is configured to provide communication between the receptacle 100 (and controller 205) and outside devices (for example, other receptacles, electrical devices, external computers, smart phones, tablets, etc.). In such an embodiment, the receptacle 100 may communicate with the one or more outside devices through a network. The network is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In such an embodiment, the controller 205 may receive the one or more user inputs via an outside device.

In one embodiment of operation, controller 205 receives a motion signal from the motion sensor 215 and a light signal from the photosensor 220. The controller 205 compares the motion signal to a motion threshold and the light signal to a light threshold. When the motions signal crosses the motion threshold and the light signal crosses the light threshold, the controller 205 turns on the guide lights 135. In some embodiments, the controller 205 may turn on the guide lights 135 when at least one selected from the group consisting of the motion threshold and the light threshold crosses the respective threshold. In some embodiments, the guide lights 135 remain on for a predetermined time period (for example, thirty second, one minute, two minutes, etc.) since motion is last detected.

In another embodiment of operation, controller 205 receives a motion signal from the motion sensor 215 and a light signal from the photosensor 220. The controller 205 compares the motion signal to a motion threshold and the light signal to a light threshold. When the motions signal crosses the motion threshold and the light signal crosses the light threshold, the controller 205 allows power to be provided to one or more outlet faces 110 of the receptacle 100. In some embodiments, the controller 205 may allow power to one or more outlet faces 110 when at least one selected from the group consisting of the motion threshold and the light threshold crosses the respective threshold. In some embodiments, the power is provided to one or more outlet faces 110 for a predetermined time period (for example, thirty second, one minute, two minutes, etc.) since motion is last detected. Such an embodiment may allow for a lamp, or other electrical device, to receive power from the receptacle 100 when light and/or motion are detected.

Figure 3:
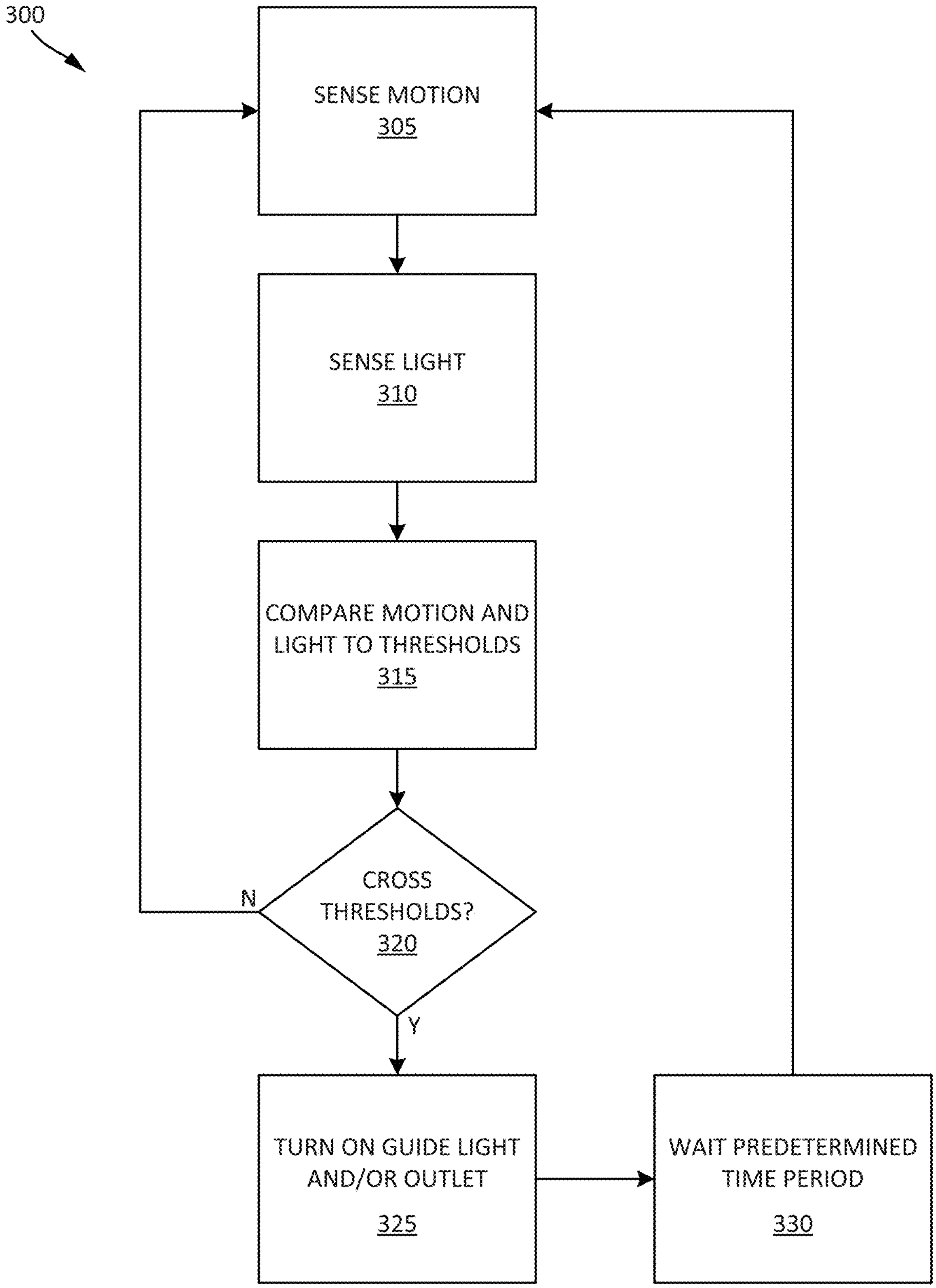
FIG. 3 is a flowchart illustrating a process, or operation, of the receptacle of FIG. 1 according to some embodiments.

FIG. 3 is a flowchart illustrating a process, or operation, 300 of the receptacle 100. Operation 300 may be performed by controller 205. It should be understood that the order of the steps disclosed in method 300 could vary. Additional steps may also be added to the control sequence and not all of the steps may be required. The motion sensor 215 senses motion and outputs a motion signal corresponding to the sensed motion (block 305). The photosensor 220 senses light and outputs a light signal corresponding to the sensed light (block 310). The controller 205 receives the motion signal and the light signals and compares the signals to a motion threshold and a light threshold, respectively (block 315). The controller 205 determines if the motion and light signals cross the motion and light thresholds (block 320). If the motion and light signals do not cross the motion and light thresholds, operation 300 cycles back to block 305.

If the motion and light signals cross the motion and light thresholds, controller 205 turns on guide lights 135 and/or provides power to one or more outlet faces 110 (block 325). Controller 205 maintains the guide lights 135 on, and/or maintains providing power to one or more outlet faces 110, for a predetermined time (block 330). Operation 300 then cycles back to block 305.

Figure 4:
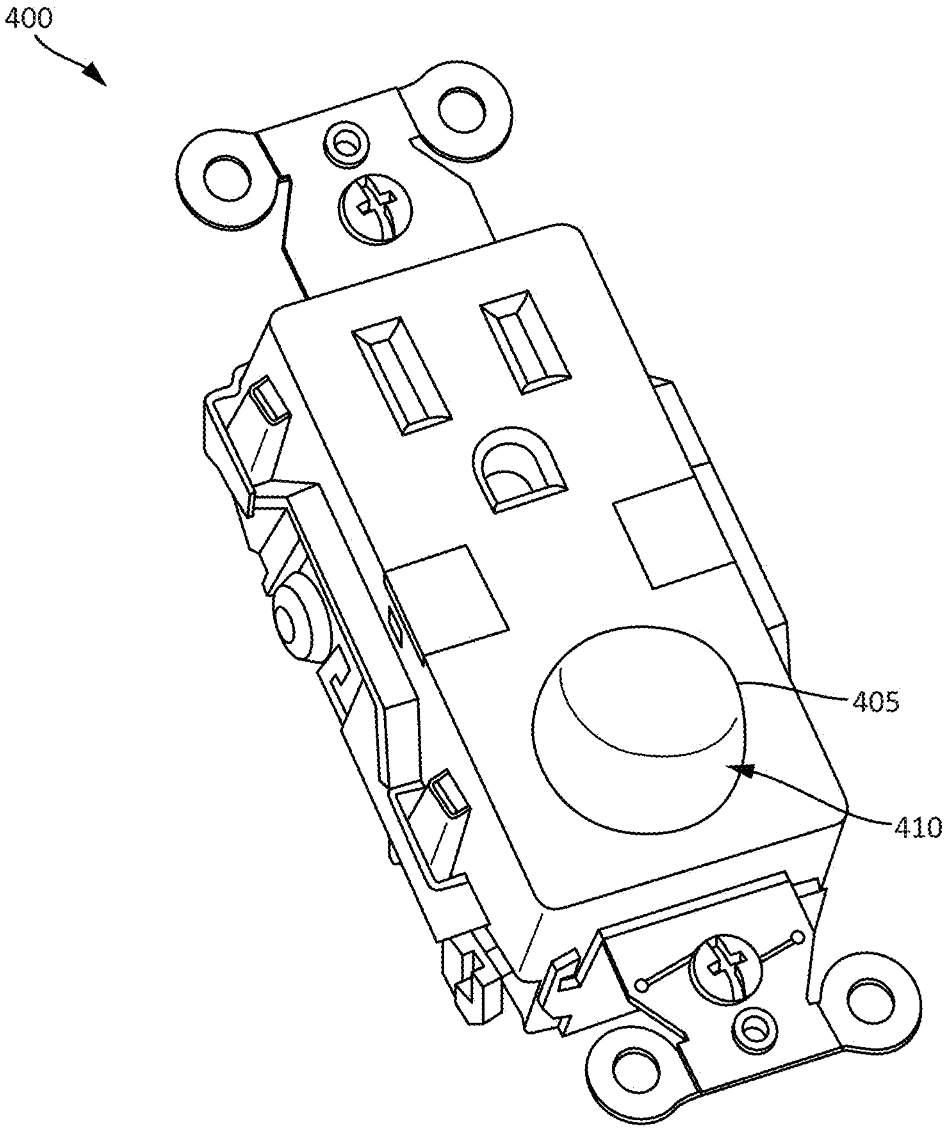
FIG. 4 is a perspective view of a receptacle according to some embodiments.

FIG. 4 is a perspective view of a receptacle 400 according to some embodiments. Receptacle 400 may be substantially similar to receptacle 100, include substantially similar components, and/or operate in a similar manner. In the illustrated embodiment, receptacle 400 includes an opening 405, accommodating a lens 410. In such an embodiment, the motion sensor 215 and the photosensor 220 may be located proximate the lens 410 and are configured to detect motion and light and/or other electromagnetic energy, respectively, through the lens 410.

Figure 5:
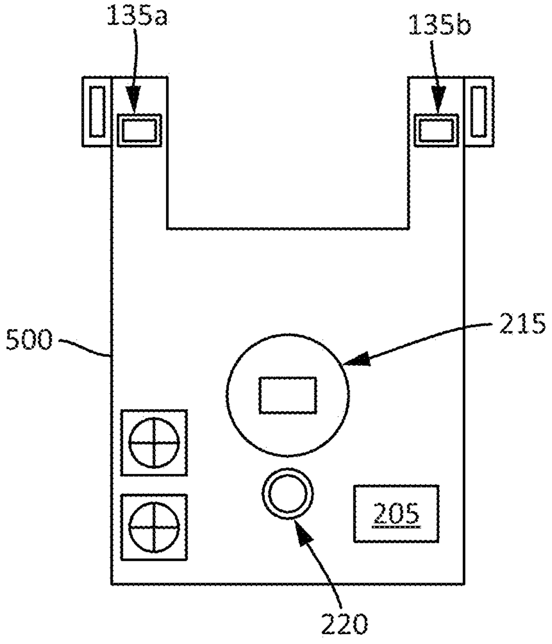
FIG. 5 is a circuit board diagram of a printed circuit board (PCB) of the receptacle of FIG. 4 according to some embodiments.

FIG. 5 illustrates a circuit board diagram of a printed circuit board (PCB) 500 of the receptacle 400 according to some embodiments. PCB 500 may be substantially similar to PCB 200 and may be electrically and/or communicatively coupled to similar components. In the illustrated embodiment, photosensor 220 is located proximate motion sensor 215, such that the motion sensor 215 and the photosensor 220 are configured to provide detection through the lens 410.

Figure 6:
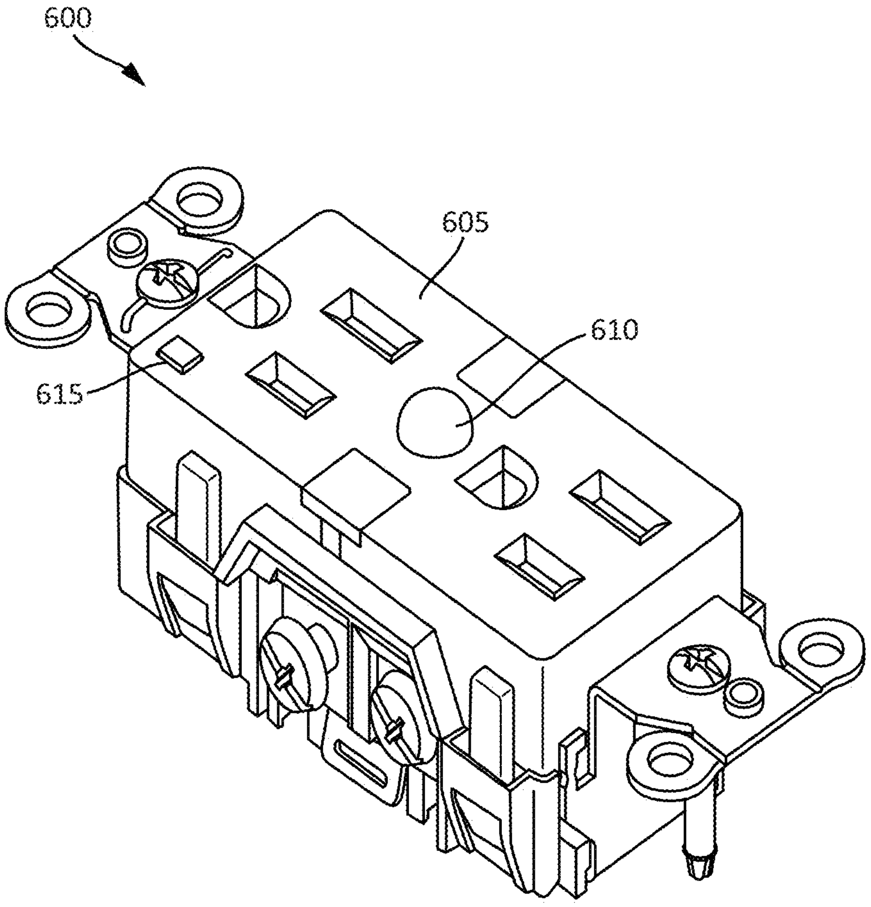
FIG. 6 is a perspective view of a receptacle according to some embodiments.

FIG. 6 is a perspective view of a receptacle 600 according to some embodiments. Receptacle 600 may be substantially similar to receptacle 100, include substantially similar components, and/or operate in a similar manner. In the illustrated embodiment, receptacle 600 includes a front cover 605 having a first outlet face 110*a* and a second outlet face 110*b*. In the illustrated embodiments, the outlet faces 110 are duplex outlet faces having a phase opening 115*a*, 115*b*, a neutral opening 120*a*, 120*b*, and a ground opening 125*a*, 125*b*. The front cover 605 may also include a first lens 610 and the second lens 615. In the illustrated embodiment, the first lens 610 is located between the outlet faces 110, while the second lens 615 is located proximate a corner of the front cover 605. In other embodiments, the second lens 615 may be located proximate a different corner of the front cover 605. In the illustrated embodiment, the motion sensor 215 may be located proximate the first lens 610 and be configured to detect motion through the first lens 610. Additionally, in the illustrated embodiment, the photosensor 220 may be located proximate the second lens 615 and be configured to detect light and/or other electromagnetic energy through the second lens 615.

Figure 7:
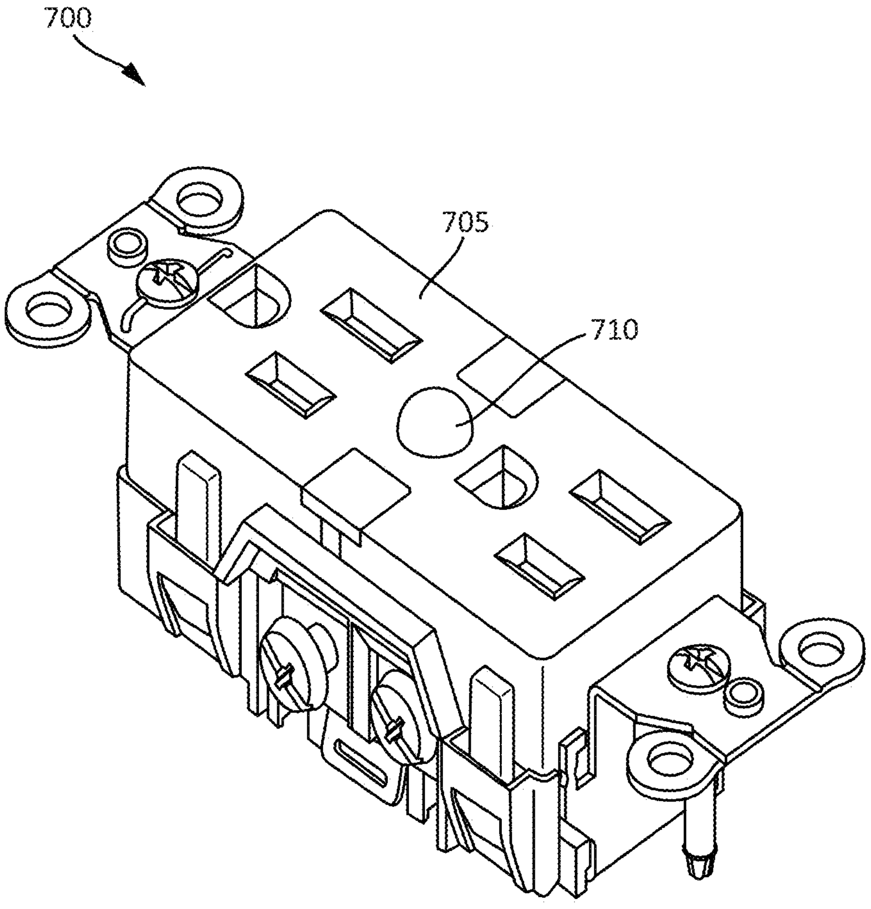
FIG. 7 is a perspective view of a receptacle according to some embodiments.

FIG. 7 is a perspective view of a receptacle 700 according to some embodiments. Receptacle 700 may be substantially similar to receptacle 100, include substantially similar components, and/or operate in a similar manner. In the illustrated embodiment, receptacle 700 includes a front cover 705 having a first outlet face 110*a* and a second outlet face 110*b*. In the illustrated embodiments, the outlet faces 110 are duplex outlet faces having a phase opening 115*a*, 115*b*, a neutral opening 120*a*, 120*b*, and a ground opening 125*a*, 125*b*. The front cover 705 may also include a lens 710. In the illustrated embodiment, the lens 710 is located between the outlet faces 110. In such an embodiment, the motion sensor 215 and the photosensor 220 may be located proximate the lens 710 and are configured to detect motion and light and/or other electromagnetic energy, respectively, through the lens 710.

Figure 8:
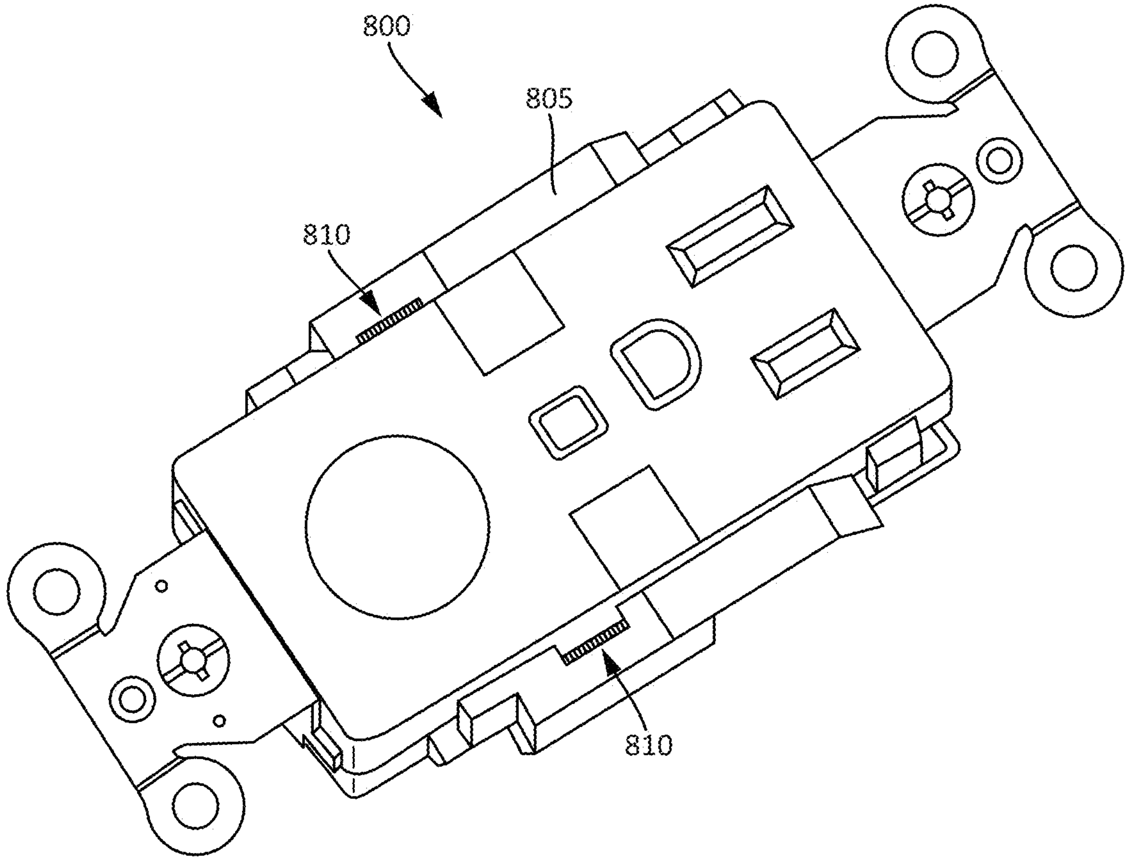
FIG. 8 is perspective view of a receptacle according to some embodiments.

FIG. 8 is a perspective view of a receptacle 800 according to some embodiments. Receptacle 800 may be substantially similar to receptacle 100, include substantially similar components, and/or operate in a similar manner. In the illustrated embodiment, receptacle 800 includes a front cover 805 having an outlet face 110. The front cover 805 may also include user-inputs 810. In some embodiments, user-inputs 810 are substantially similar to user-inputs 225.

Thus, embodiments provide, among other things, a receptacle having a motion activated guide light. Various features and advantages of the application are set forth in the following claims.

What is claimed is:

1. A receptacle comprising:

a housing having a front cover;

an outlet having an outlet face located on the front cover;

a printed circuit board (PCB) located within the housing, wherein the PCB includes a PCB base and two or more PCB portions extending from the PCB base;

a light located on at least one of the two or more PCB portions, the light configured to project light through the front cover;

a photosensor located on the PCB, the photosensor configured to detect light and output a light signal corresponding to the detected light;

a motion detector located on the PCB, the motion detector configured to detect motion and output a motion signal corresponding to the detected motion; and a controller located on the PCB base and connected to the light, the photosensor, and the motion detector, the controller having a memory and an electronic processor, the controller configured to receive the light signal from the photosensor, receive the motion signal from the motion detector, compare the light signal to a light signal threshold, compare the motion signal to a motion signal threshold, and activate the light when the light signal crosses the light signal threshold and the motion crosses the motion signal threshold.

2. The receptacle of claim 1, wherein the controller activates the light for a predetermined time period.

3. The receptacle of claim 2, wherein the predetermined time period is set via a user input.

4. The receptacle of claim 1, wherein the photosensor is located proximate a lens of the front cover.

5. The receptacle of claim 1, wherein the motion detector is located proximate a lens of the front cover.

6. The receptacle of claim 1, wherein the photosensor and the motion detector are located proximate a lens of the front cover.

7. The receptacle of claim 1, wherein the motion detector is located proximate a first lens of the front cover and the photosensor is located proximate a second lens of the front cover.

8. The receptacle of claim 1, further comprising a second outlet located on the front cover.

9. The receptacle of claim 1, wherein the housing further includes a rear cover having a line terminal and a line terminal screw configured to electrically connect to a line.

10. The receptacle of claim 1, further comprising a ground yoke/bridge assembly having mounting ears.

11. The receptacle of claim 1, wherein the housing includes a rear cover configured to be secured within an electrical box.

12. A method of controlling a receptacle including an outlet having an outlet face, the method comprising:

detecting light via a photosensor located on a printed circuit board (PCB) having a PCB base and two or more PCB portions extending from the PCB base, the photosensor configured to output a light signal corresponding to the detected light;

detecting motion via a motion detector located on the PCB, the motion detector having a 180° viewing angle and configured to output a motion signal corresponding to the detected motion;

comparing, via a controller located on the PCB base, the light signal to a light signal threshold;

comparing, via the controller, the motion signal to a motion signal threshold; and activating a guide light of the receptacle, when the light signal crosses the light signal threshold and the motion crosses the motion signal threshold.

13. The method of claim 12, wherein the guide light of the receptacle is activated for a predetermined time period.

14. The method of claim 13, wherein the predetermined time period is set via a user input.

15. The method of claim 12, wherein the controller provides power to the outlet face when the light signal crosses the light signal threshold and the motion crosses the motion signal threshold.

16. A receptacle comprising:

a housing having a front cover;

an outlet having an outlet face located on the front cover;

a printed circuit board (PCB) located within the housing, wherein the PCB includes a PCB base and two or more PCB portions extending from the PCB base;

a light located on at least one of the two or more PCB portions, the light configured to project light through the front cover;

a photosensor located on the PCB, the photosensor configured to detect light and output a light signal corresponding to the detected light;

a motion detector having a 180° viewing angle located on the PCB, the motion detector configured to detect motion and output a motion signal corresponding to the detected motion; and a controller located on the PCB base and connected to the light, the photosensor, and the motion detector, the controller having a memory and an electronic processor, the controller configured to receive the light signal from the photosensor, receive the motion signal from the motion detector, compare the light signal to a light signal threshold, compare the motion signal to a motion signal threshold, and activate the light when the light signal crosses the light signal threshold and the motion crosses the motion signal threshold.

17. The receptacle of claim 16, wherein the controller activates the light for a predetermined time period.

18. The receptacle of claim 17, wherein the predetermined time period is set via a user input.

19. The receptacle of claim 1, wherein the photosensor and the motion detector is located proximate a lens of the front cover.

20. The receptacle of claim 1, wherein the motion detector is located proximate a first lens of the front cover and the photosensor is located proximate a second lens of the front cover.

* * * * *